3,157,637
METHOD OF SEPARATING NUCLEOTIDES
Joseph X. Khym, Oak Ridge, Tenn., assignor to the United States of America as represented by the United States Atomic Energy Commission
No Drawing. Filed May 21, 1963, Ser. No. 282,177
10 Claims. (Cl. 260—211.5)

My invention relates to methods of purifying nucleotides.

Nucleotides are useful as research tools in inquiring about the functions of living organisms. For these uses it is advantageous to obtain the nucleotides as single species. The primary source of nucleotides, living tissue, contains these substances together with extraneous substances such as proteins, lipids, and other cellular components. Procedures are known by which nucleotides, originally part of a living organism, can be isolated and made available as a class of substances; however, the separation of nucleotides from each other is difficult. Some separations have been made by paper chromatography and ion exchange chromatography; however, these methods have limitations, and improved methods are desirable.

It is accordingly one object of my invention to provide an improved method for isolating nucleotides into groups or classes of nucleotides.

It is another object to provide an improved method of separating a group or class of nucleotides into its component parts.

It is still another object to provide a rapid method of obtaining substantially pure nucleotides in large quantities.

Other objects of my invention will be apparent from the following detailed description and the claims appended hereto.

In accordance with my invention I have provided a method of separating at least one nucleotide selected from the group consisting of di-, tri- and tetra-phosphates of adenosine, uridine, cytidine, and guanosine from an aqueous solution comprising the steps of providing said aqueous solution with anions of a water-soluble salt, contacting the resulting anion-containing solution with a substantially water-immiscible organic solution comprising an organic diluent and a primary aliphatic amine salt, and separating the resulting nucleotide-containing solution from the aqueous solution.

My method is capable not only of separating these nucleotides from proteins, lipids, and other cellular components, but also of separating the individual nucleotides from each other. Separation of nucleotides from each other is possible because of different extraction coefficients of amines for the various species of nucleotides.

In carrying out my invention an aqueous solution containing nucleotides is provided with a source of anions. These anions act as a buffer to control the pH of the aqueous solution and keep the organic and aqueous phases compatible during the extraction step. The operable range of pH for the aqueous solution depends on the specific amine salt used as an extracting agent, and must be at a value to keep the amine in its salt form. A pH range of 2.5 to 7.0 is preferred. The concentration of the anions controls the degree to which a nucleotide is extracted by an amine salt, an increase in concentration of inorganic anions reducing the extraction coefficient for nucleotides. The total anion concentration is preferably in the range of 0.1 to 0.5 molar. Although any anion may be used, the preferred anions are acetate, formate, chloride, and sulfate. The anion content may be a single species or any mixture thereof. The anion may be furnished in the form of any water-soluble salt such as the alkali metal salts.

The anion-containing aqueous solution is then contacted with the organic solution containing the amine salt. The anion of the amine salt may be any anion compatible with the aqueous phase, and it is preferred that the anion be the same as the predominant anion in the aqueous phase.

While a wide variety of primary amines extract nucleotides to some extent, the preferred amines are the branched chain primary amines, especially the branched-chain amines having molecular weights above 200. Typical of the preferred amines are 3-ethyl-1-isobutyloctylamine, 1-(3-ethylpentyl)-4-ethyloctylamine, and 1-nonyldecylamine.

The organic solvent may be any substantially water-immiscible liquid organic compound capable of dissolving the specific amine salt selected as the extracting agent. Typical useful solvents are esters such as isoamyl acetate, butyl acetate, and amyl acetate; ethers such as butyl ether and propyl ether; and alcohols such as octyl alcohol, tridecanol, and hexanol.

The concentration of amine in the solvent determines the degree to which a specific nucleotide is extracted, the extraction coefficient increasing in substantially a straight line relationship with an increase in the concentration of the amine salt at least in the range of about 0.025 to over 0.5 molar.

The extracted nucleotides can be removed from the organic solution by contacting the organic solution with an aqueous stripping solution containing anions in a relatively high concentration, i.e., over about one molar. The same anions provided in the aqueous solution in the extracting step may be used to strip the nucleotides from the organic solution.

The extracted nucleotides can also be removed from the organic solution by contacting the organic solution with an alkaline solution which converts the amine salt to the free amine. This releases the extracted material which then appears in the aqueous phase.

Having thus described my invention, the following examples are offered to illustrate it in more detail.

EXAMPLE I 5 milliliters of an aqueous solution 0.5 molar in sodium acetate, having a pH of 3.7, and containing 1 micromole per milliliter of adenosine triphosphate was mixed with an equal volume of a 0.1 molar solution of 3-ethyl-1-isobutyloctylamine acetate in isoamyl acetate by shaking the two solutions together for 10 minutes. The aqueous and organic phases were then separated. Analysis of the solutions disclosed that 98 percent of the adenosine triphosphate had transferred to the organic phase.

EXAMPLE II

The procedure of Example I was followed using 1-(3-ethylpentyl)-4-ethyloctylamine acetate as the extractant. Approximately 99 percent of the adenosine triphosphate transferred to the organic phase.

EXAMPLE III

The procedure of Example I was followed using 1-nonyldecylamine acetate as the extractant. Approximately 99 percent of the adenosine triphosphate transferred to the organic phase.

EXAMPLE IV

The procedure of Example I was followed using a mixture of branched-chain primary amines having from 18 to 22 carbon atoms. This mixture was obtained from Rohm and Haas Company and is identified as JM-T. Approximately 98 percent of the adenosine triphosphate transferred to the organic phase.

As can be seen from Examples I–IV, the branched-chain primary amines are highly effective in removing adenosine triphosphate from an aqueous solution.

In Examples V–VIII below, other primary amines and secondary and tertiary amines were used as extractants.

EXAMPLE V

The procedure of Example I was followed using 3,5,5-trimethylhexylamine formate as the extractant. Less than one percent of the adenosine triphosphate transferred into the organic phase.

EXAMPLE VI

The procedure of Example I was followed using the secondary branched-chain amine bis(1-isobutyl-3,5-dimethylhexyl)amine acetate as the extractant. Approximately 18 percent of the adenosine triphosphate transferred into the organic phase.

EXAMPLE VII

The procedure of Example I was followed using the tertiary amine N,N-dimethyldodecylamine acetate as the extractant. Approximately 7 percent of the adenosine triphosphate transferred into the organic phase.

EXAMPLE VIII

The procedure of Example I was followed using the branched-chain tertiary amine triisooctylamine acetate as the extractant. No adenosine triphosphate was detected in the organic phase.

As can be seen from Examples V–VIII, low molecular weight primary amines having slight branching and secondary and tertiary amines are not effective in extracting adenosine triphosphate.

In Examples IX–XVI, the procedure of Example I was followed to extract other nucleotides from aqueous solution using 0.1 molar JM–T formate in isoamyl acetate to extract the nucleotides from a 0.1 molar formate aqueous phase. The results are given in the following table.

*Table I*

[Organic Phase=0.1 molar JM–T Formate in Isoamyl Acetate. Aqueous Phase=0.1 molar Sodium Formate. pH=4.7]

| Example No. | Compound | Extraction Coefficient |
|---|---|---|
| IX | Cytidine diphosphate | 0.5 |
| X | Cytidine triphosphate | 10.3 |
| XI | Adenosine diphosphate | 3.5 |
| XII | Adenosine triphosphate | 27.0 |
| XIII | Uridine diphosphate | 1.7 |
| XIV | Uridine triphosphate | 19.0 |
| XV | Guanosine diphosphate | 2.7 |
| XVI | Guanosine triphosphate | 12.0 |

As can be seen from Examples IX–XVI, the extraction coefficient of the amine used therein is different for each nucleotide, thus permitting separation of nucleotides from each other. Other primary amines have this same characteristic.

The foregoing examples are given to illustrate my invention and are not intended to limit it. It is obvious that changes may readily be made in amines, diluents, content of the aqueous solutions, and concentrations of materials in both the organic and aqueous solutions. My invention may be used to separate nucleotides from each other as well as from related substances. My invention is particularly useful when carried out by counter-current extraction techniques.

Having thus described my invention, I claim:

1. A method of separating at least one nucleotide selected from the group consisting of di-, tri-, and tetra-phosphates of adenosine, uridine, cytidine, and guanosine from an aqueous solution containing said nucleotide comprising the steps of providing said aqueous solution with a water-soluble salt, adjusting the pH of said solution to a value from 2.5 to 7.0, contacting the resulting salt solution with a substantially water-immiscible organic solution comprising an organic diluent and a primary amine salt, the cation of said salt being represented by the formula $$[RNH_3]^+$$

where R is a saturated aliphatic hydrocarbon, and separating the resulting nucleotide-containing organic solution from the aqueous solution.

2. The method of claim 1 wherein the aqueous solution is provided with anions selected from the group consisting of acetate, formate, chloride, and sulfate.

3. The method of claim 2 wherein the anions are provided in said aqueous solution in a concentration of 0.1 to 0.5 molar.

4. The method of claim 1 wherein the primary amine has a molecular weight greater than 200.

5. The method of claim 1 wherein the primary amine is a branched-chain amine having a molecular weight greater than 200.

6. A method of separating a mixture of at least two nucleotides selected from the group consisting of di-, tri-, and tetra-phosphates of adenosine, uridine, cytidine, and guanosine into its component parts comprising the steps of making a water solution of said mixture, providing the resulting aqueous solution with adjusting the pH of the resulting solution to a value from 2.5 to 7.0, contacting the resulting salt solution with a substantially water-immiscible organic solution comprising an organic diluent and a primary amine salt, the cation of said salt being represented by the formula $$[RNH_3]^+$$

where R is a saturated aliphatic hydrocarbon, whereby at least one of said nucleotides is transferred into said organic solution to a greater degree than other of said nucleotides, and separating the resulting nucleotide-containing organic solution from the remaining aqueous solution.

7. The method of claim 6 wherein the aqueous solution is provided with anions selected from the group consisting of acetate, formate, chloride, and sulfate.

8. The method of claim 7 wherein the anions are provided in said solution in a concentration of 0.1 to 0.5 molar.

9. The method of claim 6 wherein the primary amine has a molecular weight greater than 200.

10. The method of claim 6 wherein the primary amine is branched-chain amine having a molecular weight greater than 200.

References Cited in the file of this patent

UNITED STATES PATENTS 2,549,827    Laufer et al. _____ Apr. 24, 1951

UNITED STATES PATENT OFFICE
CERTIFICATE OF CORRECTION

Patent No. 3,157,637

November 17, 1964

Joseph X. Khym

It is hereby certified that error appears in the above numbered patent requiring correction and that the said Letters Patent should read as corrected below.

Column 4, line 36, after "with" insert -- a water-soluble salt, --; line 59, after "is" insert -- a --.

Signed and sealed this 11th day of May 1965.

(SEAL)
Attest:

ERNEST W. SWIDER
Attesting Officer

EDWARD J. BRENNER
Commissioner of Patents